(12) United States Patent
Tippmann et al.

(10) Patent No.: US 8,220,287 B2
(45) Date of Patent: Jul. 17, 2012

(54) APPARATUS AND METHOD FOR BLAST FREEZING OR THAWING A PRODUCT

(75) Inventors: Gerald P. Tippmann, Ft. Wayne, IN (US); Vincent P. Tippmann, Jr., Ft. Wayne, IN (US)

(73) Assignees: Vincent P. Tippmann, Sr., Fort Wayne, IN (US); Family Partnership, LLP, Fort Wayne, IN (US)

( * ) Notice: Subject to any disclaimer, the term of this patent is extended or adjusted under 35 U.S.C. 154(b) by 1213 days.

(21) Appl. No.: 11/336,900

(22) Filed: Jan. 23, 2006

(65) Prior Publication Data

US 2006/0185528 A1 Aug. 24, 2006

Related U.S. Application Data

(60) Provisional application No. 60/645,027, filed on Jan. 21, 2005.

(51) Int. Cl.
*F25D 17/04* (2006.01)
(52) U.S. Cl. .................. 62/415; 62/413; 62/414
(58) Field of Classification Search ............ 62/413–414, 62/419
See application file for complete search history.

(56) References Cited

U.S. PATENT DOCUMENTS

| | | | | |
|---|---|---|---|---|
| 4,063,432 A * | 12/1977 | Chaussy et al. | ................. | 62/419 |
| 4,779,524 A * | 10/1988 | Wade | ............... | 99/476 |
| 4,824,685 A * | 4/1989 | Bianco | ........... | 426/418 |
| 5,054,291 A * | 10/1991 | Davis et al. | ......... | 62/62 |
| 5,425,521 A * | 6/1995 | Locke | ........ | 248/346.02 |
| 6,128,911 A * | 10/2000 | Mathews et al. | ............... | 62/256 |
| 6,901,768 B1 * | 6/2005 | Windecker | .................... | 62/407 |

* cited by examiner

*Primary Examiner* — Cheryl J Tyler
*Assistant Examiner* — Jonathan Koagel
(74) *Attorney, Agent, or Firm* — Birch, Stewart, Kolasch & Birch, LLP

(57) ABSTRACT

A method and apparatus for treating a commodity includes a plurality of boxes arranged in two rows with a space formed therebetween. A cover is provided for sealing the two rows of boxes at least along the top surface. A plenum is formed between the two rows of boxes with the plurality of boxes being positioned side-by-side. At least one air handler is positioned to pull air through and/or around the plurality of boxes and through ventilation holes in the boxes and/or through spacers positioned between adjacent boxes and along a length of the space formed between the two rows. The air may be discharged upwardly, horizontally or downwardly therefrom. An even flow of air is achieved between adjacent boxes, through ventilation holes in the boxes and/or through spacers positioned between adjacent boxes and along the two rows of pallets for evenly treating a commodity positioned on the pallets.

15 Claims, 6 Drawing Sheets

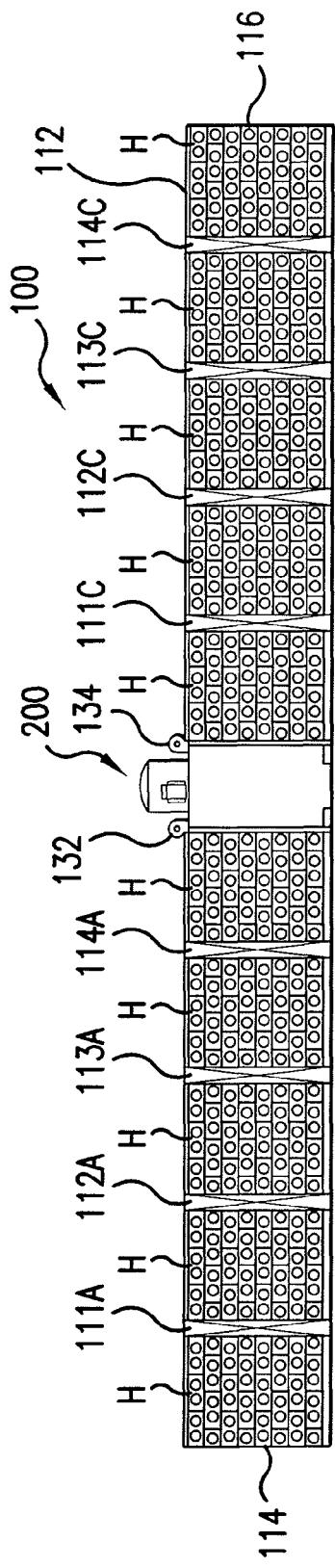
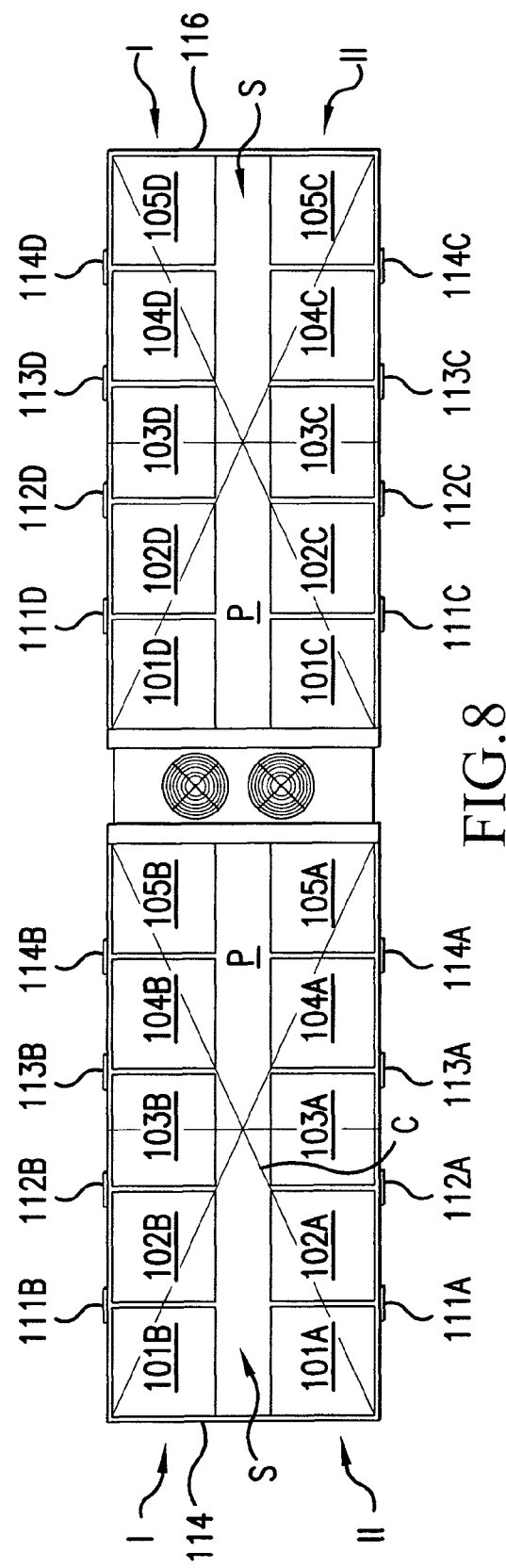
FIG.7
FIG.8

APPARATUS AND METHOD FOR BLAST FREEZING OR THAWING A PRODUCT

CROSS-REFERENCE TO RELATED APPLICATIONS

The present application claims priority under 35 USC 119(e) to U.S. Provisional Patent Application No. 60/645,027 filed on Jan. 21, 2005 the entire contents of which are hereby incorporated by reference.

BACKGROUND OF THE INVENTION

1. Field of the Invention

The present invention is directed to a method and apparatus for blast freezing or thawing a frozen commodity such as a food product.

2. Description of Background Art

It is common in the food industry to use a blast freezer to freeze various food products. Normally, a blast freezer requires the use of an expensive specially designed tunnel in which food products are positioned on pallets within the tunnel. The tunnel is built in a freezer that is maintained at a temperature of approximately −40° Fahrenheit (−40° Celsius). Air is blown or pushed onto the food products disposed in the tunnel to freeze the food products. However, as the cold air is first blown or pushed towards the first pallet of food products to be frozen, the air is warmed by the temperature of the food products so that the second pallet in the row is exposed to a warmer air as compared to the first pallet of food products. This problem is exacerbated as air is blown or pushed towards the third pallet and thereafter the fourth pallet and subsequent pallets. Thus, the food products positioned on the last pallet will be frozen at a different time as compared to food products disposed directly adjacent to the air handler. After the food products are frozen, the food products are transferred to a freezer that is maintained at a temperature of approximately −20° Fahrenheit (−28.88° Celsius) or at a temperature of approximately −10° Fahrenheit (−23.33° Celsius).

A similar problem occurs when it is desired to thaw the food products. For example, the food products may be positioned on a loading dock and subjected to ambient air to thaw the food products. Normally, a plurality of pallets of food products are arranged on the loading dock or in a warehouse and ambient air is blown or pushed towards the pallets. If the ambient air is at 72° Fahrenheit (22.22° Celsius), the first pallet of food products will thaw first and may reach a temperature above the mandated safety zone of 40° Fahrenheit (4.44° Celsius). The thawing of the food products on a loading docket or in a warehouse may lead to the growth of bacteria in the food products that may be transmitted to contaminate adjacent food products and other areas of the warehouse. In addition, the thawing of a food product in this manner may lead to the discoloration of the food product. Further, the food products will be thawed unevenly and thus lead to problems in determining which food products are properly thawed for delivery to a customer. Still further, the thawing of a frozen food products in ambient air leads to the production of condensation within the boxes of the food products. This will produce a wet or soggy box with a wet food product that is not suitable for delivery to a customer.

Another way to thaw a food product is to position the food product in a cooler that is maintained at a temperature of approximately 37° Fahrenheit (2.77° Celsius). Again the pallets of food products have air that is blown or pushed towards the pallets. The pushing of the air unto the pallets of food products will lead to the thawing of the food on the pallet that is located immediately adjacent to the air handler. Pallets of food products that are displaced away from the first pallet will be thawed at a different rate. It is difficult to determine when the various pallets of food products are properly thawed. Uneven thawing will lead to the need to use a longer time to thaw the food products. By using the conventional blowing or pushing of air method towards the food products, it takes approximately 7 to 10 days to thaw a frozen food product, such as ham or turkey, in a cooler.

SUMMARY AND OBJECTS OF THE INVENTION

It is an object of the present invention to provide a method and apparatus for treating a commodity, such as blast freezing a food product, by pulling air through and/or around pallets and through ventilation holes in boxes stacked on the pallets.

It is another object of the present invention to provide a method and apparatus for treating a commodity, such as thawing a food product, by pulling air through and/or around pallets and through the ventilation holes in the boxes stacked on the pallets.

It is a further object of the present invention to provide a plurality of pallets of the commodity that are formed in two rows with a space formed therebetween. A cover is positioned over at least the top surface of the commodities to form a plenum. An air handler is positioned to pull air from between the plurality of pallets and through the ventilation holes in the boxes stacked on the pallets and along the length of the space formed between the two rows for achieving an even flow of air for treating the commodity positioned on the pallets.

These and other objects of the present invention are achieved by providing a method and apparatus for treating a commodity, such as blast freezing or thawing a food product, that includes a plurality of boxes of the commodity arranged in two rows with a space formed therebetween. A cover is provided for sealing the two rows of boxes along at least the top surface. A plenum is formed between the two rows of boxes with the plurality of boxes being spaced apart from adjacent boxes to permit a flow of air therebetween. An air handler is positioned to pull air from between the plurality of pallets and through the ventilation holes in the boxes and along a length of the space formed between the two rows and discharges the air upwardly or horizontially or downwardly therefrom. An even flow of air is achieved from between adjacent boxes and through the boxes and along the two rows of boxes for evenly treating a commodity positioned on the pallets. Corrugated material may be positioned beneath and/or between adjacent boxes to provide a ventilation space therebetween.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a side elevational view of a plurality of pallets of a commodity being spaced relative to each other and with an air handler being disposed substantially in a central location relative to the plurality of pallets and with the spaces formed between adjacent pallets being covered;

FIG. 8 is a top plan view of a plurality of pallets of a commodity being spaced relative to each other and with an air handler being disposed substantially in a central location relative to the plurality of pallets and the spaces formed between adjacent pallets being covered;

DETAILED DESCRIPTION OF THE PREFERRED EMBODIMENTS

Figure 1:
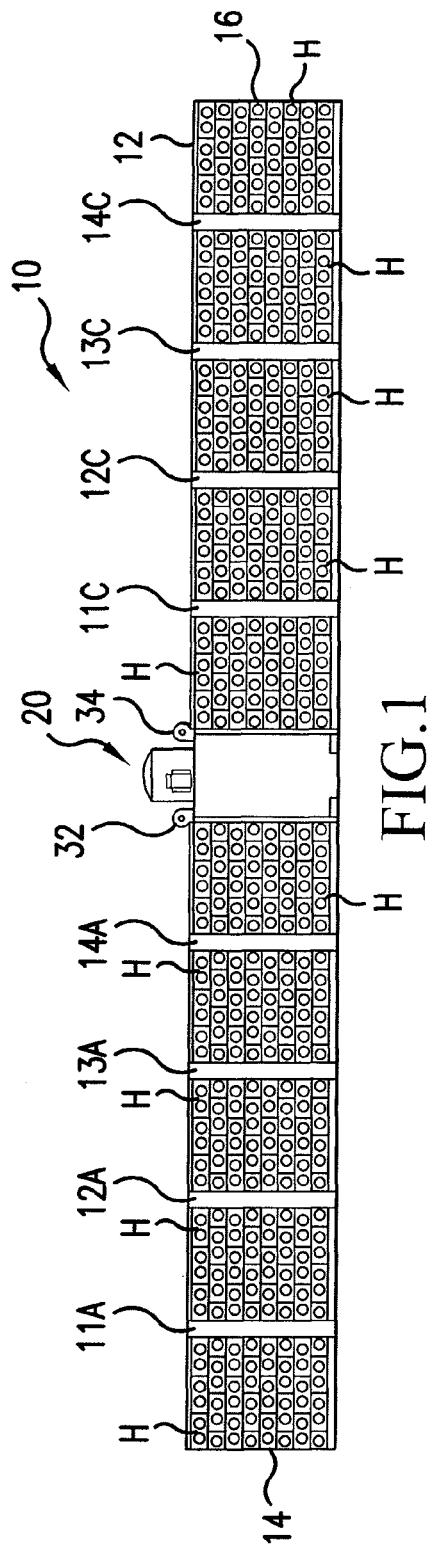
FIG. 1 is a side elevational view of a plurality of pallets of a commodity being spaced relative to each other and with an air handler being disposed substantially in a central location relative to the plurality of pallets.
Figure 2:
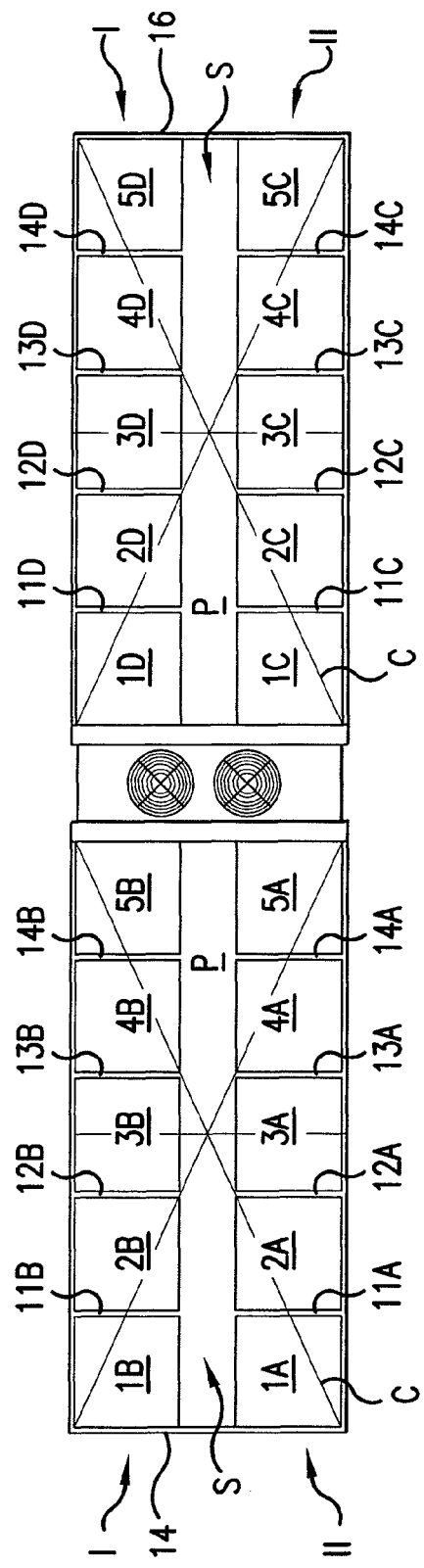
FIG. 2 is a top plan view of a plurality of pallets of a commodity being spaced relative to each other and with an air handler being disposed substantially in a central location relative to the plurality of pallets.
Figure 3:
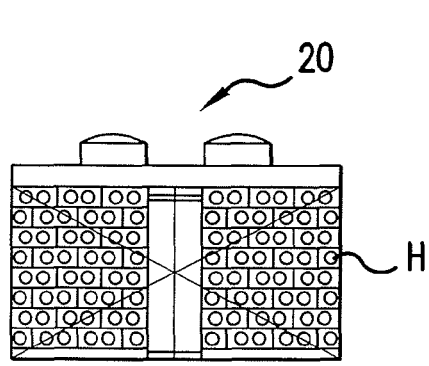
FIG. 3 is a end view of the pallets with a commodity stacked thereon.

As illustrated in FIGS. 1-3, an apparatus 10 is provided for treating a commodity, such as blast freezing or thawing a food product. A plurality of pallets 1A-5A, 1B-5B, 1C-5C and 1D-5D are provided with the commodity stacked on the pallets and the pallets arranged in two rows I and II with a space S formed therebetween. The term space means both that the pallets are substantially equally disposed relative to each other to form a continuous space between the pallets. In addition, the term space means that the pallets may be arranged at an angle with corners of the end pallets engaging each other and the space continuing to enlarge from the end pallets to an air handler 20.

A cover C is positioned to be placed on at least the top surface 12 of the commodities for sealing the two rows of pallets along the top surface. In one embodiment, the cover C can also extend along end surfaces 14, 16 for sealing the two rows of pallets along the top surface 12 and the end surfaces 14, 16. The cover C may be a flexible tarp for positioning on the top surface of the commodities that is sucked up tight to make a seal as air is pulled through the space formed between the pallets and through the ventilation holes in the boxes stacked on the pallets. In another embodiment, the cover C may be a more rigid board material that is positioned on the top surface of the commodities.

As stated above, it is to be understood that the two rows I and II of pallets 1A-5A, 1B-5B and 1C-5C, 1D-5D may be arranged in straight rows as illustrated in FIGS. 1 and 2. In another embodiment, the two rows I and II may be formed at an angle wherein the end pallets of boxes 1A, 1B and 5C, 5D touch each other for closing the rows. This embodiment is contemplated by the claims and is equivalent to positioning the cover C over the ends of the two rows I and II of pallets for sealing the ends.

A plenum P is formed between the two rows I and II of the pallets 1A-5A, 1B-5B and 1C-5C, 1D-5D with the plurality of pallets being spaced apart 11A-14A, 11B-14B, 11C-14C and 11D-14D from adjacent pallets to permit a flow of air therebetween. The boxes of commodities positioned on the pallets include a plurality of ventilation holes H for permitting air to be pulled through the boxes as the commodity is either blast frozen or thawed.

The air handler 20 is positioned between the two rows I and II of pallets and is spaced along a length thereof. As illustrated in FIGS. 1 and 2, the air handler 20 is disposed at approximately the mid-point of the two rows I and II. In other embodiments of the present invention, two or more air handlers 20 may be positioned along the length of the two rows I and II to ensure a proper flow of air between the pallets. The air handler 20 pulls air from between the plurality of pallets 11A-14A, 11B-14B, 10C-14C and 11D-14D and along a length of the space S formed between the two rows I and II and discharges the air either upwardly, horizontally or downwardly therefrom. The discharge of air upwardly permits the air that has been either cooled by thawing a commodity or warmed by blast freezing a commodity to be discharged towards the ceiling in the room in which the pallets are positioned.

Figure 4:
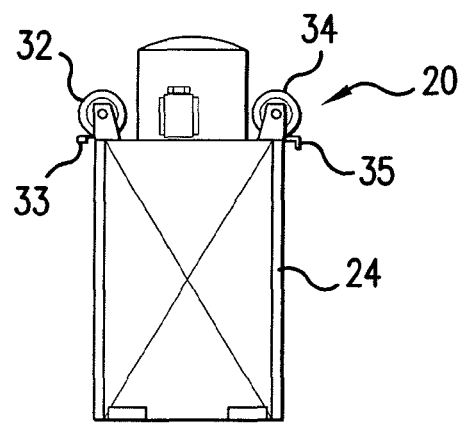
FIG. 4 is a end elevational view of an air handler that is positioned between the two rows of pallets.
Figure 5:
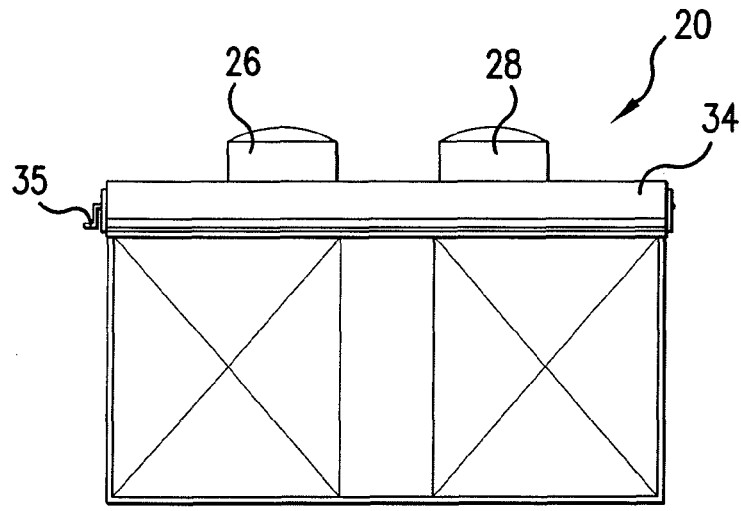
FIG. 5 is a side elevational view of the air handler illustrated in FIG. 4.
Figure 6:
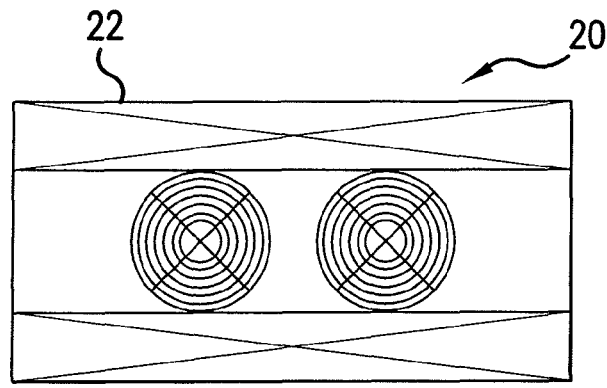
FIG. 6 is a top plan view of the air handler illustrated in FIG. 4.

As illustrated in FIGS. 4-6, the air handler 20 includes a housing 22, 24 that is approximately the size of a pallet loaded with boxes of a commodity. At least one fan 26 that is operatively connected to a motor is disposed within the housing for creating an even flow of air that is pulled from between adjacent pallets 11A-14A, 11B-14B, 10C-14C and 11D-14D and along the two rows I and II of the pallets 1A-5A, 1B-5B, 1C-5C and 1D-5D and through the holes H in the boxes for evenly treating a commodity positioned in the boxes on the pallets.

As illustrated in FIGS. 5 and 6, two fans 26, 28 may be provided for creating an even flow of air that is pulled between adjacent pallets 11A-14A, 11B-14B, 11C-14C and 11D-14D and along the two rows I and II of the pallets 1A-5A, 1B-5B, 1C-5C and 1D-5D and through the ventilation holes H in the boxes for evenly treating a commodity positioned in the boxes on the pallets.

By positioning the air handler 20 between the rows I and II of pallets, an even flow of air is achieved from between adjacent pallets 11A-14A, 11B-14B, 11C-14C and 11D-14D and along the two rows I and II of the pallets 1A-5A, 1B-5B, 1C-5C and 1D-5D and through the holes H in the boxes for evenly treating a commodity positioned in the boxes on the pallets.

As illustrated in FIGS. 1, 4 and 5, the cover C or tarps 32, 34 may be secured directly on the air handler 20 for permitting the cover C or tarps 32, 34 to be extended therefrom for covering at least a top surface 12 of the commodities positioned in the boxes disposed on the pallets. The cover C or tarps 32, 34 may be rolled up for storage by using the handles 33, 35. In one embodiment, the cover C or tarps 32, 34 may also extend along end surfaces 14, 16 for sealing the two rows of pallets along the top surface 12 and the end surfaces 14, 16.

In one embodiment of the present invention, the pallets are positioned in a cooler wherein the temperature of the cooler is maintained at approximately 37° Fahrenheit (2.77° Celsius). This temperature is below the mandated safe zone of 40° Fahrenheit (4.44° Celsius). A frozen food product is thawed using the present invention in a cooler in approximately 24 to 36 hours. A substantial amount of energy can be conserved by using the cold air from the frozen product to maintain the temperature in the cooler at approximately 37° Fahrenheit (2.77° Celsius). The cold, frozen product provides cooling for the cooler.

The apparatus 10 of the present invention may be used as a blast freezer for freezing the commodity, such as a food product. By placing the pallets of food products in a freezer at −20° Fahrenheit (−28.88° Celsius) and using an air handler 20 an even flow of air is achieved from between adjacent pallets 11A-14A, 11B-14B, 10C-14C and 11D-14D and through the ventilation holes in the boxes stacked on the pallets and along the two rows I and II of the pallets 1A-5A, 1B-5B, 1C-5C and 1D-5D for evenly blast freezing a commodity positioned in the boxes on the pallets. Thereafter the products may be positioned into a freezer that is maintained at approximately −1° Fahrenheit (−23.33° Celsius).

A substantial savings in energy is achieved by using the present invention to blast freeze a product. The expensive, specially designed tunnel positioned in a freezer that is maintained at a low temperature of approximately −40° Fahrenheit (−40° Celsius) is no longer needed.

The present invention includes a method that may be used to blast freeze or thaw the commodity, such as a food product. The thawing of the commodity may be performed in a cooler that is maintained at a temperature below the mandated safe zone for thawing food products within the safe zone.

The present invention may be used with any number of pallets arranged in straight rows or in rows disposed at an angle relative to each other. The air handler 20 is portable for positioning the air handler 20 in a warehouse, a cooler, a freezer, on a loading dock or in any environment for permitting the treating of a commodity as the need arises. The present invention is not limited for use in a cooler or a freezer. The present invention provides for tempered thawing or blast freezing for ensuring that a commodity is properly handled depending on the conditions required for the commodity.

The speed of blast freezing or thawing permits the present invention to process a commodity very quickly. For example, with regard to a food product, a code date is provided for the food product that starts to run as the food product is thawed. If the code date is 10 days, a conventional way of thawing the food product would take approximately 7 to 10 days. Thus, the code date has expired or almost expired by the time the food product is thawed. According to the present invention, the thawing occurs within 24 to 36 hours. Thus, a substantial time still remains with regard to the code date for permitting a customer to have sufficient time to use the food product in a restaurant or to sell the food product in a grocery store.

The blast freezing of a food product according to the present invention occurs within 36 hours at a temperature of approximately −8° Fahrenheit (−22.220 Celsius). This is to be compared to a conventional tunnel that is used to blast freeze a food product in 72 hours at a temperature of approximately 40° Fahrenheit (−40° Celsius). Again, a substantial saving occurs by reducing the time and the energy needed for blast freezing the food product. Thus, a better turn over occurs to permit additional food products to be blast frozen by using the present invention.

Pulling the air through the pallets makes it possible to form a plenum to block the air flow where needed by using a tarp that is sucked up tight to make a seal as compared to providing a rigid structure. By pulling the air through the pallets and through the ventilation holes in the boxes stacked on the pallets the air flow seals the tarps to the product without the need of using a rigid structure.

As illustrated in FIGS. 7 and 8, an apparatus 100 is provided for treating a commodity, such as blast freezing or thawing a food product. A plurality of pallets 101A-105A, 101B-105B, 101C-105C and 101D-105D are provided with the commodity stacked on the pallets and the pallets arranged in two rows I and II with a space S formed therebetween. The term space means both that the pallets are substantially equally disposed relative to each other to form a continuous space between the pallets. In addition, the term space means that the pallets may be arranged at an angle with corners of the end pallets engaging each other and the space continuing to enlarge from the end pallets to an air handler 20.

A cover C is positioned to be placed on at least the top surface 112 of the commodities for sealing the two rows of pallets along the top surface. In one embodiment, the cover C can also extend along end surfaces 114, 116 for sealing the two rows of pallets along the top surface 112 and the end surfaces 114, 116. The cover C may be a flexible tarp for positioning on the top surface of the commodities that is sucked up tight to make a seal as an air flow is pulled through the venilation holes H. In another embodiment, the cover C may be a more rigid board material that is positioned on the top surface of the commodities.

As stated above, it is to be understood that the two rows I and II of pallets 101A-105A, 101B-105B and 101C-105C, 101D-105D may be arranged in straight rows as illustrated in FIGS. 7 and 8. In another embodiment, the two rows I and II may be formed at an angle wherein the end pallets of boxes 101A, 101B and 105C, 105D touch each other for closing the rows. This embodiment is contemplated by the claims and is equivalent to positioning the cover C over the ends of the two rows I and II of pallets for sealing the ends.

A plenum P is formed between the two rows I and II of the pallets 101A-105A, 101B-105B and 101C-105C, 101D-105D. The plurality of pallets may be spaced apart with covers 111A-114A, 111B-114B, 111C-114C and 111D-114D disposed in the space for blocking the flow of air. The covers 111A-114A, 111B-114B, 111C-114C and 111D-114D may be a tarp that is secured to adjacent pallets with Velcro. The space between adjacent pallets may be eliminated if the boxes are stacked on the pallets with the boxes extending to the edge of the pallets so as to permit boxes stacked on adjacent pallets to touch each other. The boxes of commodities positioned on the pallets include a plurality of ventilation holes H for permitting air to be pulled through the boxes as the commodity is either blast frozen or thawed.

The air handler 200 is positioned between the two rows I and II of pallets and is spaced along a length thereof. As illustrated in FIGS. 7 and 8, the air handler 200 is disposed at approximately the mid-point of the two rows I and II. In other embodiments of the present invention, two or more air handlers 200 may be positioned along the length of the two rows I and II to ensure a proper flow of air through the ventilation holes in the boxes stacked on the pallets. The air handler 200 pulls air from through the ventilation holes in the boxes stacked on the pallets and along a length of the space S formed between the two rows I and II and discharges the air either upwardly, horizontially or downwardly therefrom. The discharged air that has either been cooled by thawing a commodity or warmed by blast freezing a commodity may be discharged towards the ceiling and/or horizontally and/or downwardly in the room in which the pallets are positioned.

Figure 9:
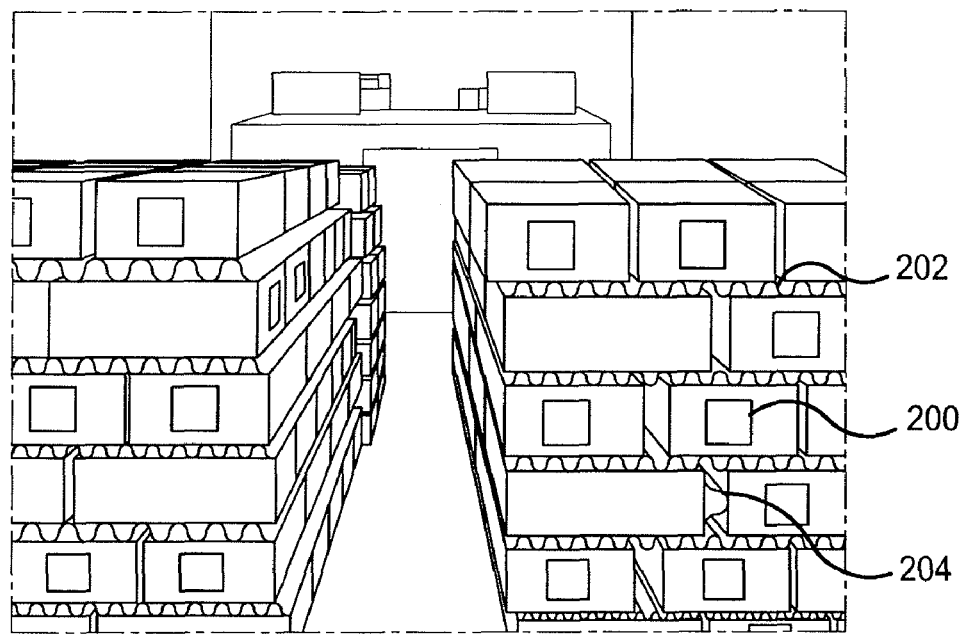
FIG. 9 is an end view illustrating a plurality of boxes that are arranged in rows and stacked with corrugated material being disposed underneath and between adjacent boxes for permitting ventilation by pulling air between adjacent boxes.
Figure 10:
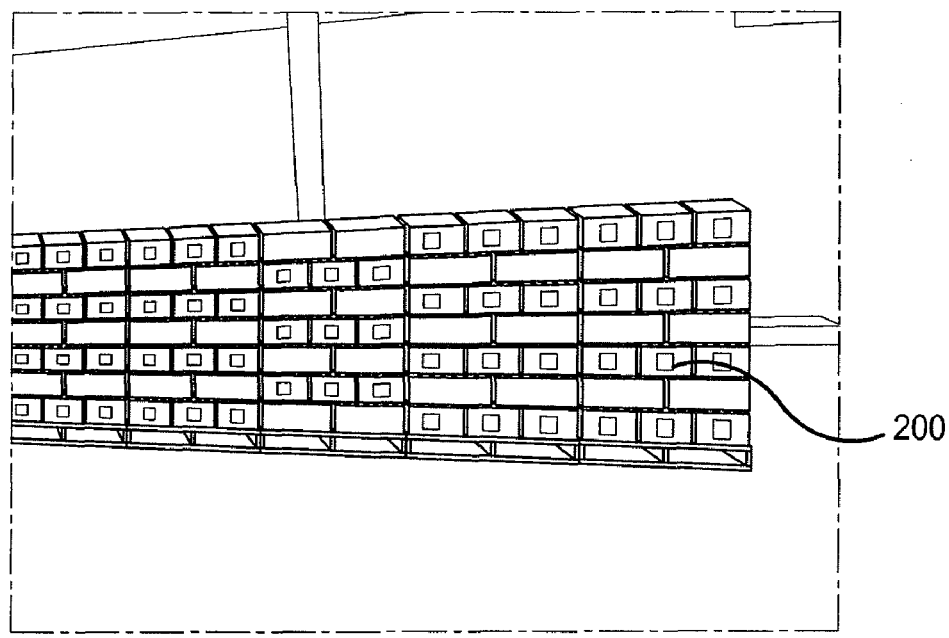
FIG. 10 is a side view illustrating a plurality of boxes that are stacked on each other with corrugated material being disposed underneath and between adjacent boxes for permitting ventilation by pulling air between adjacent boxes.

FIGS. 9 and 10 illustrate another embodiment of the present invention wherein a plurality of boxes 200 are arranged in rows and stacked with corrugated material 202 being disposed underneath the boxes 200 and corrugated material 204 being disposed between adjacent boxes 200 for permitting ventilation by pulling air underneath and between adjacent boxes. The corrugated material 202, 204 may be similar to egg carton separators that are used in stacking eggs in a box. In the present invention, the corrugated material 202, 204 provides an air space for permitting ventilation underneath and between the boxes 200 to enable air to be pulled therethrough to permit blast freezing or thawing of a frozen commodity contained in the boxes 200.

In the embodiment illustrated in FIGS. 9 and 10, the plurality of boxes 200 do not include ventilation holes. The boxes 200 are constructed of cardboard or other material and the boxes 200 are stacked on each other. The corrugated material 202, 204 that is disposed underneath and between adjacent boxes permits ventilation by enabling air to be pulled underneath and between adjacent boxes.

It is also contemplated by the present invention to permit the corrugated material 202, 204 to be used together with the boxes that do contain ventilation holes as illustrated in FIGS. 1, 3 and 7. In this embodiment, air would be pulled through the ventilation holes in the boxes. In addition, due to the positioning of the corrugated material 202, 204 underneath and between the boxes, air would also be pulled underneath and between adjacent boxes to permit blast freezing or thawing of a frozen commodity contained in the boxes 200.

The configuration of the present invention affords an opportunity to utilize aisle ways in a freezer or cooler or to utilize an individual room in a freezer or cooler to blast freeze or thaw a commodity.

Figure 11:
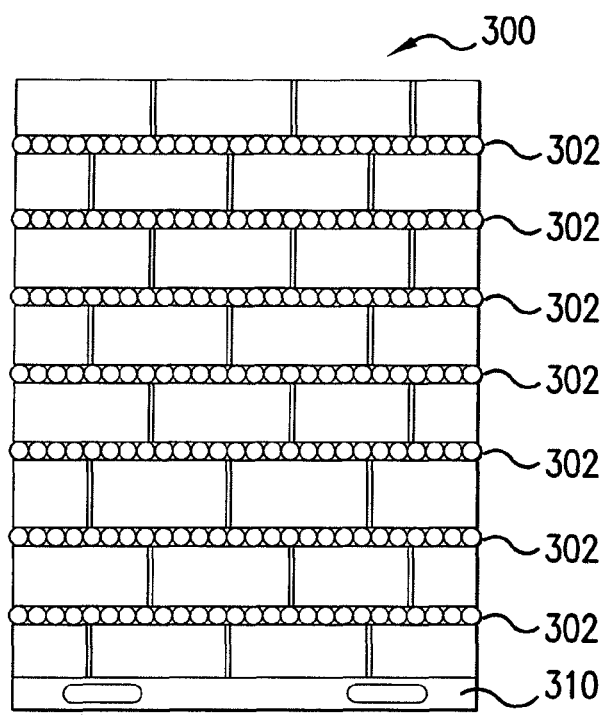
FIG. 11 is end view illustrating a plurality of boxes that are arranged in rows and stacked with plastic formed spacer being disposed underneath adjacent boxes for permitting ventilation by pulling air between adjacent boxes.

In the embodiment illustrated in FIG. 11 the plurality of boxes 300 do not include ventilation holes. The boxes 300 are constructed of cardboard or other material and the boxes 300 are stacked on each other and positioned on a pallet 310. Plastic formed spacers 302 are disposed underneath adjacent boxes for permitting ventilation by enabling air to be pulled underneath adjacent boxes.

It is also contemplated by the present invention to permit the plastic formed spacers 302 to be used together with the boxes that do contain ventilation holes as illustrated in FIGS. 1, 3 and 7. In this embodiment, air would be pulled through the ventilation holes in the boxes. In addition, due to the positioning of the plastic formed spacers 302 underneath the boxes, air would also be pulled underneath adjacent boxes to permit blast freezing or thawing of a frozen commodity contained in the boxes 300.

Figure 12:
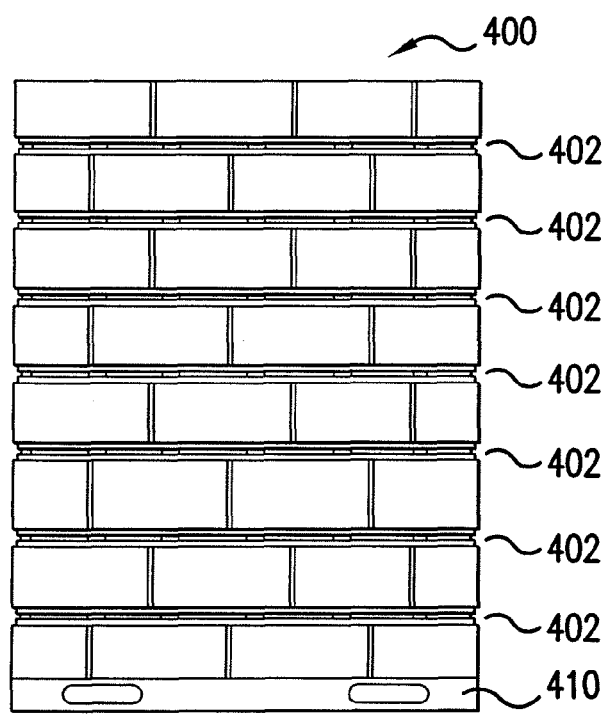
FIG. 12 is an end view illustrating a plurality of boxes that are stacked on each other with wood slat spacers being disposed underneath adjacent boxes for permitting ventilation by pulling air between adjacent boxes.

In the embodiment illustrated in FIG. 12 the plurality of boxes 400 do not include ventilation holes. The boxes 400 are constructed of cardboard or other material and the boxes 400 are stacked on each other and positioned on a pallet 410. Wood slat spacers 402 are disposed underneath adjacent boxes for permitting ventilation by enabling air to be pulled underneath adjacent boxes.

It is also contemplated by the present invention to permit the wood slat spacers 402 to be used together with the boxes that do contain ventilation holes as illustrated in FIGS. 1, 3 and 7. In this embodiment, air would be pulled through the ventilation holes in the boxes. In addition, due to the positioning of the wood slat spacers 402 underneath the boxes, air would also be pulled underneath adjacent boxes to permit blast freezing or thawing of a frozen commodity contained in the boxes 400.

Figure 13:
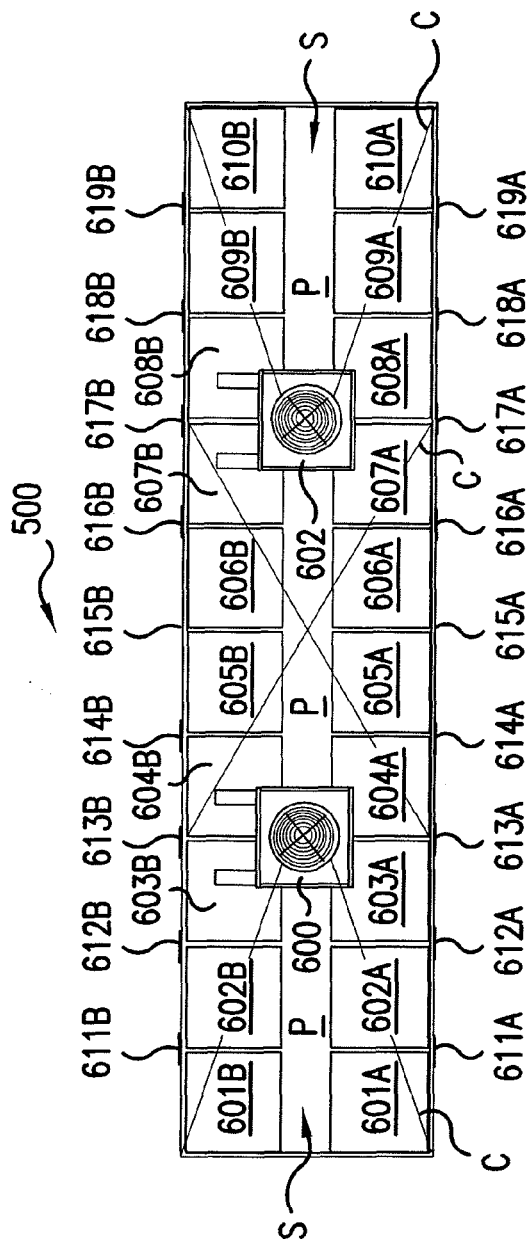
FIG. 13 is a top plan view of a plurality of pallets of a commodity being spaced relative to each other according to a second embodiment with air handlers being directly disposed to be in communication with the plenum.
Figure 14:
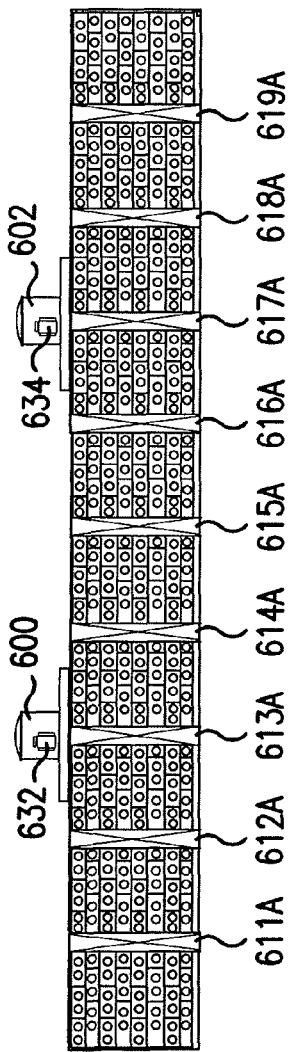
FIG. 14 is a side elevational view of a plurality of pallets of a commodity being spaced relative to each other according to the second embodiment wherein the air handlers are directly disposed to be in communication with the plenum.

As illustrated in FIGS. 13 and 14 a second embodiment of the present invention is set forth wherein a plurality of pallets 601A-610A and 601B-610B of a commodity are spaced relative to each other with air handlers 600, 602 being directly disposed to be in communication with the plenum P.

As illustrated in FIGS. 13 and 14, an apparatus 500 is provided for treating a commodity, such as blast freezing or thawing a food product. The plurality of pallets 601A-610A and 601B-610B are provided with the commodity stacked on the pallets and the pallets arranged in two rows with a space S formed therebetween. The term space means both that the pallets are substantially equally disposed relative to each other to form a continuous space between the pallets. In addition, the term space means that the pallets may be arranged at an angle with corners of the end pallets engaging each other and the space continuing to enlarge from the end pallets to each of the air handlers 600, 602.

A cover C is positioned to be placed on at least the top surface of the commodities for sealing the two rows of pallets along the top surface. In one embodiment, the cover C can also extend along end surfaces for sealing the two rows of pallets along the top surface and the end surfaces. The cover C may be a flexible tarp for positioning on the top surface of the commodities that is sucked up tight to make a seal as air is pulled through the space S formed between the pallets and through the ventilation holes in the boxes stacked on the pallets. In another embodiment, the cover C may be a more rigid board material that is positioned on the top surface of the commodities.

As stated above, it is to be understood that the two rows of pallets 601A-610A and 601B-610B may be arranged in straight rows as illustrated in FIG. 13. In another embodiment, the two rows I and II may be formed at an angle wherein the end pallets of boxes 601A, 601B and 610A, 610B touch each other for closing the rows. This embodiment is contemplated by the claims and is equivalent to positioning the cover C over the ends of the two rows of pallets for sealing the ends.

A plenum P is formed between the two rows of the pallets 601A-610A and 601B-610B with the plurality of pallets being spaced apart 601A-610A and 601B-610B from adjacent pallets to permit a flow of air therebetween. The boxes of commodities positioned on the pallets include a plurality of ventilation holes for permitting air to be pulled through the boxes as the commodity is either blast frozen or thawed.

The air handlers 600, 602 are positioned on top of and between the two rows of pallets to be in communication with the plenum P. The air handlers 600, 602 may be spaced along a length of the plenum P according to the needs of a particular freezing or thawing operation. As illustrated in FIGS. 13 and 14, the air handlers 600, 602 are disposed at approximately the one-third point along the two rows to ensure a proper flow of air between the pallets. The air handlers 600, 602 include motors 632, 634, respectively, for pulling air from between the plurality of pallets 601A-610A and 601B-610B and along a length of the space S formed between the two rows and for discharging the air either upwardly, horizontally or downwardly therefrom. The discharge of air upwardly permits the air that has been either cooled by thawing a commodity or warmed by blast freezing a commodity to be discharged towards the ceiling in the room in which the pallets are positioned.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus to freeze a commodity comprising:
   a plurality of boxes of a commodity arranged in two rows having a predetermined length or height with a space formed therebetween;
   a sealing cover positioned on at least a portion of a top surface of the commodities sealing the space between the two rows of boxes, wherein the boxes are at least one box in width along the predetermined length or height;
   a plenum formed between said two rows of boxes with the cover covering the space to enable a flow of air through ventilation holes in the boxes; and
   at least one pulling air handler pulling air in a temperature range of 8 degrees F. to −20 degrees F. (−13.33 degrees C. to −28.88 degrees C.) through the ventilation holes in the boxes and along a length of the space formed between the two rows and discharging the air therefrom, wherein an even flow of air is pulled through the ventilation holes in the boxes and along the two rows of boxes evenly freeze a commodity positioned in the boxes;
   said at least one pulling air handler being positioned approximately midway between the two rows of boxes to evenly pull air through the ventilation holes in the boxes and along the length of the space formed between the two rows, said at least one pulling air handler including a housing that is approximately the size of a stack of boxes loaded with the commodity said at least one pulling air handler being disposed within the housing to pull air from between the plurality of boxes and along the length of the space formed between the two rows.

2. The apparatus according to claim 1, wherein said commodity is a food product.

3. The apparatus according to claim 1, wherein the at least one pulling air handler includes at least one fan operatively connected to a motor being disposed within the housing to pull air from between the plurality of boxes and along the length of the space formed between the two rows.

4. The apparatus according to claim 1, and further including a cover for covering any space formed between adjacent boxes.

5. The apparatus according to claim 1, wherein two or more pulling air handlers include a housing that is approximately the size of a stack of boxes loaded with the commodity, said two or more pulling air handlers being positioned along the rows of boxes and at least one fan is operatively connected to a motor disposed within the housing to pull air through the ventilation holes in the boxes and along the length of the space formed between the two rows.

6. The apparatus according to claim 1, wherein the cover extends along end surfaces of the two rows of boxes to seal the two rows of boxes along the top surface and the end surfaces.

7. The apparatus according to claim 1, wherein the at least one pulling air handler is positioned above the two rows of boxes and being in communication with the plenum formed therebetween to evenly pull air through the ventilation holes in the boxes and along the length of the space formed between the two rows.

8. The apparatus according to claim 1, wherein two pulling air handlers are positioned above the two rows of boxes and being in communication with the plenum formed therebetween to evenly pull air through the ventilation holes in the boxes and along the length of the space formed between the two rows, said two pulling air handlers being spaced a predetermined distance from each other.

9. An apparatus to freeze a commodity comprising:
   a plurality of boxes of a commodity arranged in two rows having a predetermined length or height with a space formed therebetween;
   a sealing cover positioned on at least a portion of a top surface of the commodities sealing the space between the two rows of boxes, wherein the boxes are at least one box in width along the predetermined length or height;
   a ventilation spacer being positioned at least beneath adjacent boxes to ventilate therebetween;
   a plenum formed between said two rows of boxes with the cover positioned on the top thereof wherein a flow of air is pulled through the spacer disposed beneath the boxes; and
   at least one pulling air handler pulling air in a temperature range of 8 degrees F. to −20 degrees F. (−13.33 degrees C. to −28.88 degrees C.) through the ventilation spacer disposed beneath the boxes and along a length of the space formed between the two rows and discharging the air therefrom, wherein an even flow of air is pulled through the ventilation spacer and along the two rows of boxes to evenly freeze a commodity positioned in the boxes;
   said at least one pulling air handler being positioned approximately midway between the two rows of boxes to evenly pull air through the ventilation spacer disposed beneath the boxes and along the length of the space formed between the two rows, said at least one pulling air handler including a housing that is approximately the size of a stack of boxes loaded with the commodity said at least one pulling air handler being disposed within the housing to pull air through the ventilation spacer disposed beneath the boxes and along the length of the space formed between the two rows.

10. The apparatus to freeze a commodity according to claim 9, wherein the ventilation spacer is positioned between adjacent boxes wherein air is pulled through the ventilation spacer disposed beneath and between the boxes.

11. The apparatus to freeze a commodity according to claim 9, wherein the ventilation spacer is a corrugated material wherein air is pulled through the corrugated material disposed beneath the boxes.

12. The apparatus to freeze a commodity according to claim 9, wherein the ventilation spacer is a plastic formed spacer wherein air is pulled through the plastic formed spacer disposed beneath the boxes.

13. The apparatus to freeze a commodity according to claim 9, wherein the ventilation spacer is a wood slat spacer wherein air is pulled through the wood slat spacer disposed beneath the boxes.

14. An apparatus to freeze a commodity comprising:
   a first box of a commodity;
   a second box of a commodity;
   said first box and said second box being disposed adjacent to each other with a space formed therebetween;
   a sealing cover positioned on at least a portion of a top surface of the first box and the second box sealing the space formed between the first box and the second box along at least the top surface;

a plenum formed between said first box and the second box with the cover covering the space to enable a flow of air through the first box and the second box; and at least one pulling air handler pulling air in a temperature range of 8 degrees F. to −20 degrees F. (−13.33 degrees C. to −28.88 degrees C.) through the first box and second box and along a length of the space formed between the first box and the second box and discharging the air therefrom, wherein an even flow of air is pulled through the first box and the second box to evenly freeze a commodity positioned in the boxes;

said at least one pulling air handler being positioned adjacent to the first and second box to evenly pull air through the boxes and along the space between the first box and the second box, said at least one pulling air handler including a housing that is approximately the size of the first and second box loaded with the commodity said at least one pulling air handler being disposed within the housing to pull air through the boxes and along the length of the space formed between the first box and the second box.

15. An apparatus to freeze a commodity comprising:

a plurality of pallets of a commodity arranged in two rows having a predetermined length or height with a space formed therebetween;

a sealing cover positioned on at least a portion of a top surface of the commodities sealing the space between the two rows of pallets, wherein the pallets are at least one pallet in width along the predetermined length or height;

a ventilation spacer being positioned at least beneath adjacent boxes positioned on the pallets wherein ventilation is provided therebetween;

a plenum formed between said two rows of pallets with the cover positioned on the top thereof wherein a flow of air is pulled through the spacer disposed beneath the boxes on the pallets; and at least one pulling air handler pulling air in a temperature range of 8 degrees F. to −20 degrees F. (−13.33 degrees C. to −28.88 degrees C.) through the ventilation spacer disposed beneath the pallets and along a length of the space formed between the two rows and discharging the air therefrom for creating an even flow of air through the ventilation spacer and along the two rows of pallets for evenly freezing a commodity positioned in the boxes on the pallets:

said at least one pulling air handler being positioned approximately midway between the two rows of pallets to evenly pull air through the ventilation spacers and along the two rows of pallets, said at least one pulling air handler including a housing that is approximately the size of a stack of pallets loaded with the commodity said at least one pulling air handler being disposed within the housing to pull air through the ventilation spacers and along the length of the space formed between the two rows.

* * * * *